United States Patent

Thurston et al.

[15] 3,662,645
[45] May 16, 1972

[54] COUPLER FOR INTERCONNECTION OF TANDEM LAUNCHED AERIAL FLARES

[72] Inventors: James R. Thurston, Brigham City; Roger A. Grosgebauer, Ogden, both of Utah

[73] Assignee: Thiokol Chemical Corporation, Bristol, Pa.

[22] Filed: Mar. 9, 1970

[21] Appl. No.: 17,555

[52] U.S. Cl. ..................89/1.5 R, 102/7.2, 102/37.4, 102/37.7
[51] Int. Cl. ..........................................B64d 1/04
[58] Field of Search..................102/35.2, 35.4, 35.6, 35, 4, 102/7.2, 37.4; 89/1.5, 1, 37.6

[56] References Cited

UNITED STATES PATENTS

| | | |
|---|---|---|
| 3,308,719 | 3/1967 | Myers....................................102/7.2 |
| 3,435,725 | 4/1969 | Miller....................................102/4 X |
| 3,451,306 | 6/1969 | Lagerstrom et al........................89/1 |
| 1,090,007 | 3/1914 | Ziegenfuss............................102/35.2 |
| 1,108,654 | 8/1914 | Ziegenfuss............................102/35.2 |

*Primary Examiner*—Samuel W. Engle
*Attorney*—William R. Wright, Jr.

[57] ABSTRACT

A coupler is provided for interconnecting two aerial flares prior to and during the early stages of their launching from an aircraft in order to prevent erratic tumbling of the flares which could result in striking of the flares on some part of the aircraft. The flares stay coupled only until they are clear of the aircraft and are then pulled apart by the air turbulence in the wake of the aircraft. The coupler is formed of semi-resilient plastic and is installed in place in each flare prior to launch.

5 Claims, 2 Drawing Figures

James R. Thurston
Roger A. Grosgebauer
INVENTORS

BY *William R. Wright, Jr.*

THEIR AGENT

COUPLER FOR INTERCONNECTION OF TANDEM LAUNCHED AERIAL FLARES

The present invention relates to illuminating flares of the type launched from a flying aircraft. It relates, more particularly, to a coupler or connector which couples two flares to one another in order to improve their launch behavior.

Aerial flares dropped or launched from aircraft have long been used as devices for the purpose of illuminating areas of the ground below. A problem exists, however, in that single flares dropped from aircraft are inclined to tumble and fly about rather violently as they enter the airstream and thus create a hazard in that they may strike the tail or some other part of the aircraft and cause structural damage of a potentially dangerous nature. The present invention, however, improves this situation by coupling two flares together end to end prior to launching in order to provide a compound member having more inertia than a single flare because of the increased weight and length and thus exhibiting more stability during the launch. The coupler is so constructed that it will connect the two flares only for a brief period until they are clear of the aircraft's structure after which separation takes place and the flares descend and ignite individually.

The coupler provided by the present invention preferably is formed of semiresilient plastic such as polypropylene or the like, which has a springy action without taking a permanent set and is dimensionally stable even under extreme temperature, pressure and humidity conditions which can be expected in the environment of a flying aircraft and in the rapid change in them sometimes experienced by flares launched, for instance, from the relatively warm interior of an aircraft into a chilling and perhaps wet blast of outside air.

It is, therefore, an object of the present invention to provide an interconnector or coupler for at least two aerial flares which will interconnect them in tandem relationship during launching from an aircraft and until they are fully clear of the entire aircraft's structure.

It is also an object of the present invention to provide a coupler of the foregoing type which will interconnect two aerial flares in tandem relationship during launching from an aircraft but will automatically allow the flares to separate after the flares are entirely clear of the aircraft.

It is also an object of the present invention to provide an interconnector or coupler of the foregoing type which is practically unaffected in its operation by extreme changes in its environment.

It is also an object of the present invention to provide a coupler of the foregoing type and purpose which is simple to install without the need for tools, and is lightweight and practically corrosion free.

Other objects and advantages of the present invention will be apparent from the description and claims which follow:

Figure 1:
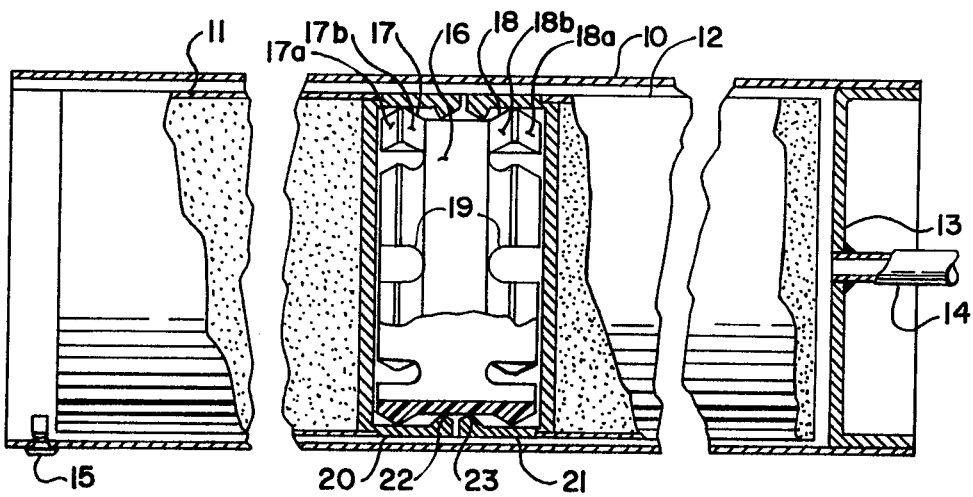
FIG. 1 is a partially cutaway cross-sectional view showing a launching tube in an aircraft with two flares in it and coupled together ready for launching.
Figure 2:
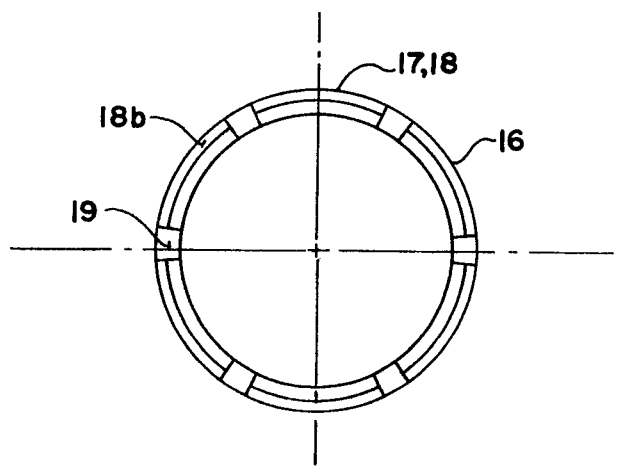
FIG. 2 is an end view of the coupler taken alone without the flares or the launching tube.

A preferred embodiment of the present invention is shown in FIGS. 1 and 2 of the drawings in which aerial illuminating flares 11 and 12 are shown arranged in tandem relationship to one another and slidably inserted into an aircraft-mounted launching tube 10 having an open launching or outboard end at the left in FIG. 1 and a closed or inboard end 13 at the right. A tube 14 is fastened to cover 13 and communicates with the interior of launch tube 10 at one end and with a source of gas pressure (not shown) at its other end. At the outer end of the launch tube 14 is a shear pin or retainer 15 which extends into launch tube 10 in the manner shown sufficiently to intercept the end of flares 11, 12 in order to keep them from falling out of the tube 10 during flight maneuvering or ground handling of the aircraft. Interposed between flares 11 and 12 is coupler or interconnector 16 which is in the form of a hollow cylinder having annular protuberances or ridges 17, 18 at each of its ends and a number of longitudinal slots 19 in its ends which are cut clear through the wall and extend part way along it in the direction of an element of the cylinder in the manner shown in both figures of the drawing.

Ridges 17, 18 are preferably annular in form, with the portions removed where the slots occur, and have double bevelled or inclined faces as shown at 17a, 17b and 18a, 18b. The ends of coupler 17 are received and surrounded by flare end covers 20, 21, respectively, which carry inwardly directed double-bevelled or inclined faced annular protuberances or ridges 22, 23 which are dimensioned to interfere with ridges 17, 18 and prevent the withdrawal of coupler 16 until sufficient force is present as later described herein to deform the coupler 10 and thus allow it to pass. The bevel angles of inclined faces 17a, 17b, 18 and 18b are preferably at an angle of about 20 degrees to the central axis of coupler 10 while the faces of the flare end protuberances 22, 23 are bevelled somewhat more steeply.

In operation, the coupler 16 is first pushed by hand into one of the flare end covers, cover 20 for instance, with the highest point of the annular protuberance 22 first travelling up the inclined face 17b of ridge 17 and causing the deformation of coupler 16 sufficiently to allow ridge 17 to retract enough to permit its passage over ridge 22 and thus to allow it to enter cover 20 after which it returns to its former position and retains the coupler 16 because of the interference between the protuberances. The coupler 16 is then pushed into the other flare in the same manner and the two flares become interconnected.

Withdrawal of coupler 16 takes place in the same manner except in reverse order. As the flares are moved apart in FIG. 1, ridges 17, 18 come in contact with ridges 22, 23, respectively, with faces 17b, 18b traversing the high portions of ridges 22, 23. Due to the incline, coupler 16 is deformed or bent inward until the ridges 17, 22 and 18, 23 pass over one another to allow disengagement.

The two flares are generally interconnected on the ground prior to flight and are then loaded into the launching tube 10 by sliding them in place after which shear pin 15 is installed to keep them in tube 10 until such time as they are launched. Shear pin 15 is sufficiently strong to prevent shearing at all times except during the actual launch. Launching in flight is initiated by the introduction of high pressure gas into the interior of tube 10 through pipe 14 which then exerts itself against the exposed end of flare 12 with a strong pushing action. This force carries through the interconnected flares 12, 11 and causes the outer end of flare 11 to push against pin 15 and to shear it, thus releasing the interconnected flares and allowing them to pass out of the launching tube overboard of the aircraft and into the airstream. Because the coupled joint is sufficiently tight to hold the two flares together as they enter the airstream and because of the considerable, although decreasing, force of the second flare against the first, they act as one unit which is about twice the length and weight of a flare launched singly and thus has a much greater weight and moment of inertia to resist the aerodynamic effects which tend to cause a single flare to tumble and rise as it enters the airstream. As a result, the interconnected or compound tandem flare follows a more subdued and stable path which does not endanger the aircraft's structure.

As soon as the interconnected flares are past the last of the aircraft's structure, usually the horizontal tail and fuselage aft end structure, they are in the wake of the aircraft which is an area of considerable aerodynamic turbulence, and this develops such a strong bending moment and other forces on the compound tandem arrangement that the two flares are quickly pulled apart after which they descend separately, ignite and parachute down in the usual manner.

It is not intended that the coupler 16 act as a sole structural supporting member between the two flares but rather as a member to keep them together and in alignment during that period of the launch when the second flare is pushing hard against the first and allowing them to separate easily later when this force has dissipated and the flares are clear of the aircraft. For this reason, while the flares are definitely interconnected by coupler 16, it is so fitted that a relatively small force, particularly in bending, will bring about separation and thus make it very definite that the flares will separate in the turbulent air of the aircraft's wake. The coupler is so dimensioned that it will in effect snap in place in the two flares but yet if the interconnected flares are, for instance, laid on a table and are picked up by the coupler they will detach, the weight of the flares (usually 30 pounds) causing sufficient force to bring this about. It will be seen, therefore, that sufficient force to detach the flares will be easily created by the aerodynamic bending forces which will be developed on them in an aircraft's wake at speeds of about 400 knots or more as the flares are buffeted about.

It is to be understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. A system for launching flares from an aircraft comprising, in combination, a launching tube attached to the aircraft, a plurality of flares initially located in said tube in tandem relationship with one another, a hollow substantially cylindrical open end in each adjacent flare, a semi resilient coupler having identical substantially cylindrical ends each fitted into the flares open ends solely with a friction fit, and ejecting means for ejecting the frictionally interconnected flares from the aircraft, whereby the flares remain in that relationship until they clear the entire aircraft, encounter its wake and are separated by the forces of the aerodynamic turbulence existing therein as they overcome the said friction.

2. The invention set forth in claim 1 with each open end having an internal annular protuberance.

3. The invention set forth in claim 1 with the coupler having an external annular protuberance at each of its ends.

4. The invention set forth in claim 3 with the ends of the coupler slotted to aid the resiliency thereof.

5. The invention set forth in claim 3 with all of the said protuberances bevelled on their annular sides and the protuberances so located on the coupler as to override the protuberances in the flares open ends upon connection or disconnection of the flares to and from the coupler.

* * * * *